June 21, 1949.    G. D. PORTER    2,474,065
DISTRIBUTION APPARATUS
Filed April 2, 1945    3 Sheets-Sheet 1

INVENTOR
Grover D. Porter
ATTORNEYS

June 21, 1949. G. D. PORTER 2,474,065
DISTRIBUTION APPARATUS
Filed April 2, 1945 3 Sheets-Sheet 2
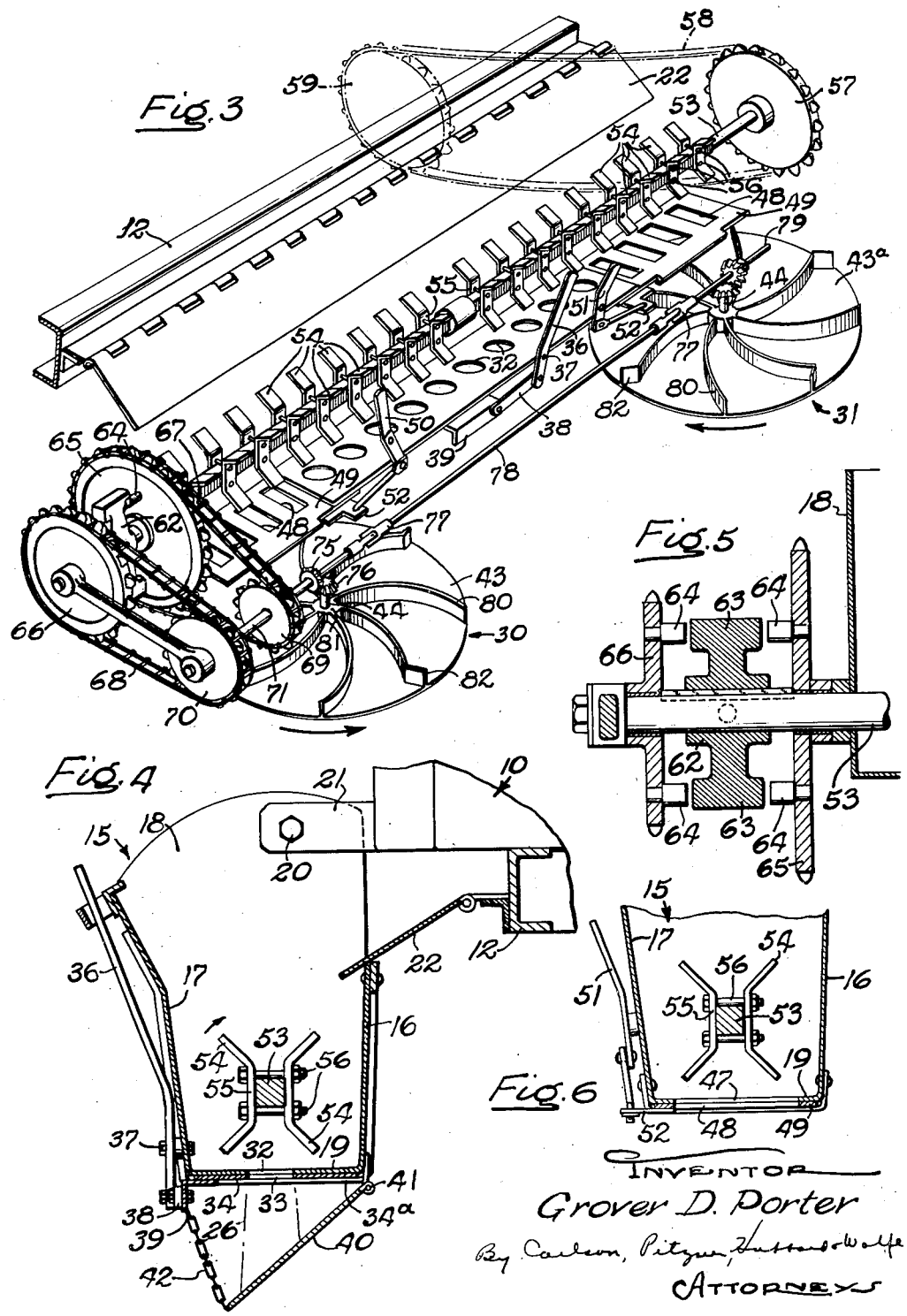
INVENTOR
Grover D. Porter
By Carlson, Pitzner, Hubbard Wolfe
ATTORNEYS

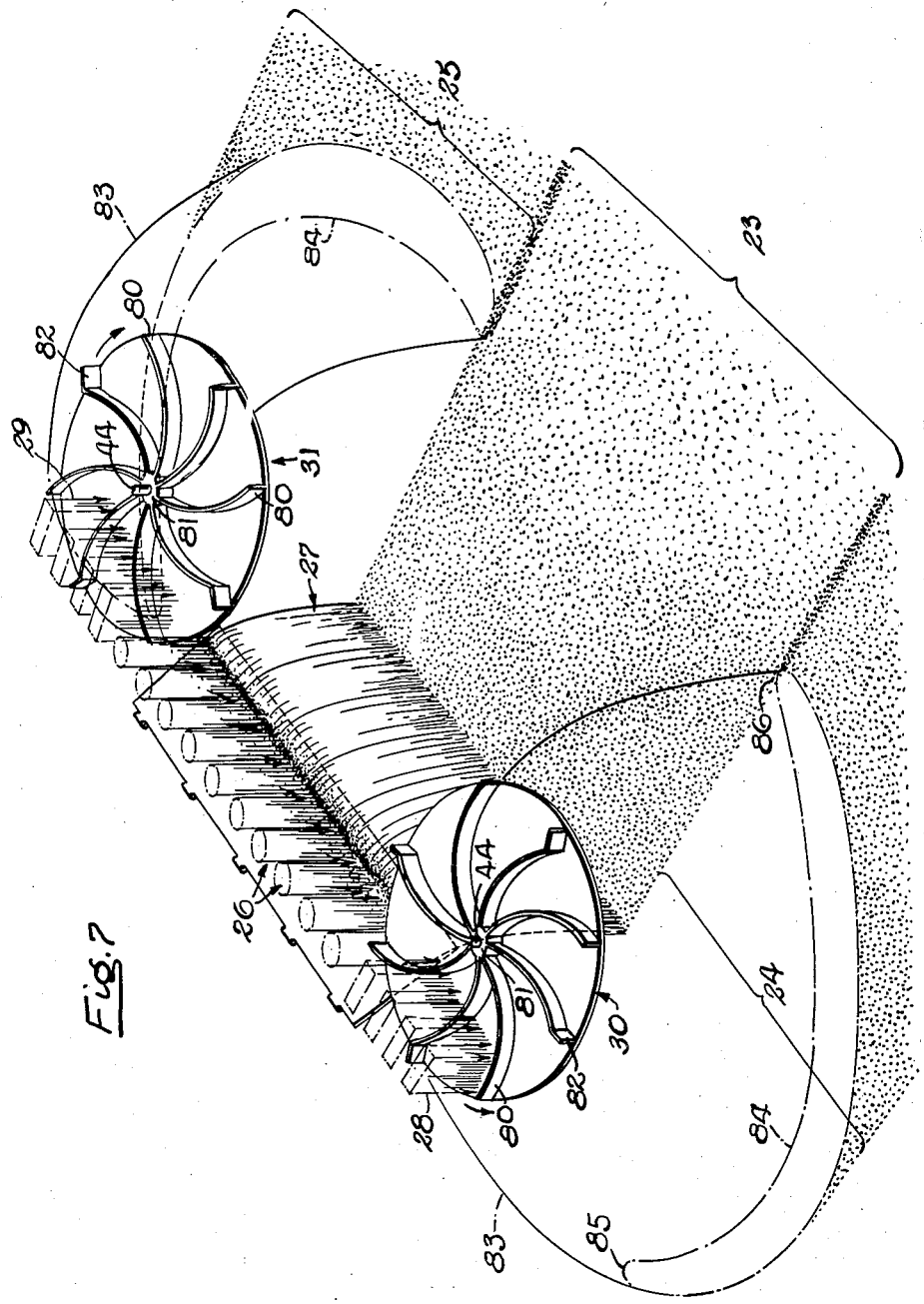

Patented June 21, 1949

2,474,065

UNITED STATES PATENT OFFICE 2,474,065

DISTRIBUTION APPARATUS

Grover D. Porter, Roscoe, Ill.

Application April 2, 1945, Serial No. 586,073

3 Claims. (Cl. 275—8)

This invention relates to apparatus for distributing loose material such as crushed or pulverized stone, sand, cinders, and the like, and has more particular reference to distributors of the type adapted to be mounted on a moving vehicle and to cover a ground area substantially wider than the vehicle.

The general object is to provide a distributor which may be readily attached to and detached from an ordinary tilting body type of dump truck, which is durable in construction, which spreads the material evenly over an area of substantial width, which distributes material selectively in variable amounts per unit area, and which is capable of efficient operation over widely varying service conditions.

A more detailed object is to provide a material spreader in which the central portion of the distribution area is covered by gravitational feed of the material, while the adjacent side portion of the area is spread by centrifugal action.

Another object is to provide for selectively varying the amounts of material distributed gravitationally and centrifugally.

A further object is to provide a novel mechanism for forming the gravitationally distributed material into a continuous curtain.

Still another object is to drive the centrifugal distributing mechanism in a novel manner.

The invention also resides in the novel construction of the centrifugal distributor and of the means for feeding the material to the gravitational and centrifugal distributors.

Other objects and advantages of the invention will become apparent from the following detailed description taken in connection with the accompanying drawings, in which Figure 1 is a rear view of a dump truck equipped with a material distributor embodying the novel features of the present invention.

Fig. 3 is a fragmentary perspective view of the improved distributor.

Fig. 4 is a transverse sectional view.

Fig. 5 is a diametrical sectional view of the speed change clutch.

Fig. 6 is a view similar to Fig. 4 taken through a different portion of the hopper.

Fig. 7 is a diagrammatic view illustrating the distributing action.

Figure 1:
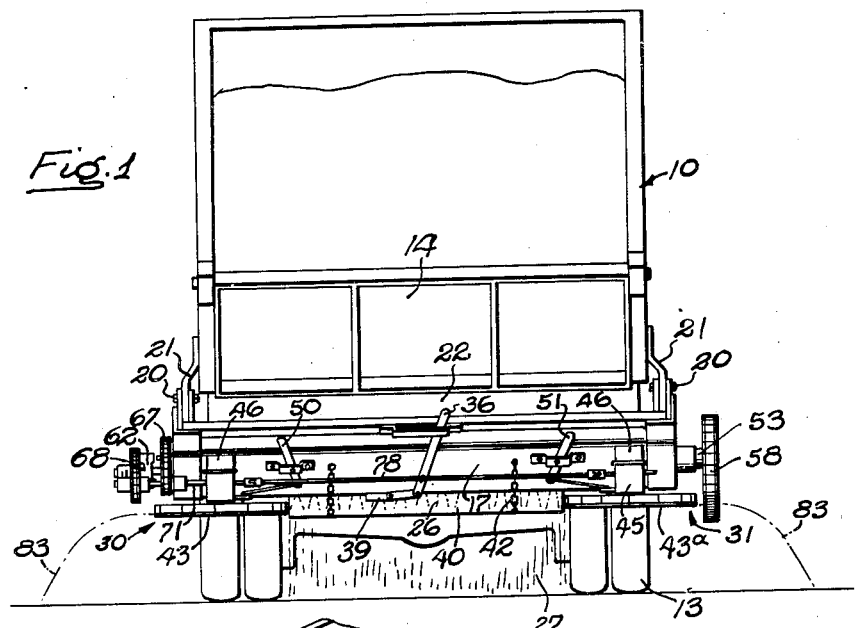

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The improved spreader mechanism constitutes an attachment adapted to be suspended pivotally on a dump body 10 hinged at 11 on the rear end of the frame 12 of a truck driven by road engaging wheels 13. The body has a hinged tailpiece 14 adjustable to control the volume of material discharged from the rear end of the body when the latter is tilted by suitable mechanism (not shown).

The present attachment includes a box-like hopper 15 of a length corresponding to the width of the truck body and having front, rear, and end walls 16, 17, and 18, and a bottom 19. The upwardly projecting end walls are connected by pivot pins 20 to the rearwardly projecting ends of bars 21 which extend along and are riveted to opposite sides of the body 10. An inclined plate 22 hinged to the rear cross member of the frame 12 rests on the front wall 16 of the hopper and deflects the discharged material into the hopper so as to enable the latter to be spaced rearwardly from the tail gate.

The material to be distributed is discharged from the hopper through a series of holes spaced along the bottom 19 and forming three groups of streams 26, 28, and 29, and the material of the respective groups is distributed over three ground areas 23, 24, and 25 (Fig. 7) which are of an overall width greater than the truck body and on the order of 18 to 24 feet. The intermediate group of streams 26 extends over about the central two-thirds of the hopper length, and these streams are formed into a continuous curtain 27 which falls onto the ground immediately beneath the hopper so as to cover the ground area 23, the width of the latter being somewhat less than the width of the vehicle body 10. The streams 28 and 29 gravitating from the end portions of the hopper fall onto power driven distributors 30 and 31 which are constructed in a novel manner to throw the materials rearwardly and laterally cover the ground areas 24 and 25 evenly.

The material streams 26 are defined by holes 32 in the bottom of the hopper, which holes cooperate with similar holes 33 in a plate 34 to form valves whose effective areas may be varied by shifting the plate endwise. The plate is held against the hopper bottom by suitable guide straps 34ª and is slidable by shifting a hand lever 36 pivoted at 37 on the rear hopper wall 17 with its lower end connected by a link 38 to a bracket 39 on the plate. By employing holes of substantial size, the danger of clogging by lumps of material is minimized.

The spaced streams of material are intercepted and formed into wider and thinner bands of material which lie closely adjacent or overlap each other so as to form the substantially continuous curtain 27. This is accomplished by the simple action of an inclined plate 40 pivoted at the junction 41 of the front and bottom hopper walls 16 and 19 with its free edge supported by chains 42 suspended from the rear hopper wall 17 so that the plate may be inclined downwardly and rearwardly at the desired angle.

The distributors 30 and 31 comprise flat circular disks 43 and 43ª rigid with central shafts 44 which are journaled in and project upwardly into gear boxes 45 carried on brackets 46 which are secured against the rear hopper wall. The boxes are so disposed that when the hopper is hanging downwardly the disks 43 and 43ª are substantially horizontal but inclined slightly downwardly and rearwardly. The spreader shafts 44 are located relative to the hopper so that the front sector of each disk is disposed beneath the end portions of the hopper to receive material gravitating downwardly through groups of holes 47 in the hopper bottom. These holes cooperate with similarly shaped holes 48 in an underlying plate 49 suitably supported by the hopper for endwise sliding adjustment to control the sizes of the streams 28 and 29. Preferably, the holes 48 are of rectangular shape with the length of the rectangles paralleling the path of travel of the vehicle so that the individual streams may be of substantially greater area than the streams 26, and, therefore, cover a substantial area of the spreader disks. Adjustment of the plates 49 may be effected by individual hand levers 50 and 51 pivoted on the hopper wall 17 and linked to brackets 52 on the plates. Thus, the amounts of material delivered through the three sets of hopper outlets may be varied individually, thereby enabling even distribution per unit area over the three different zones 23, 24, and 25, and this in spite of varying degrees of dampness of the material or other factors affecting the flow from the hopper.

To insure continuous delivery of material to all of the hopper outlets, means is provided for agitating the material within the hopper. Herein, this means comprises a squared shaft 53 projecting through and journaled in opposite end walls of the hopper and having groups of radially projecting arms 54 secured thereto at points opposite the holes 32 and 47. The arms of each group are formed by the bent ends of metal straps 55 clamped against opposite sides of the shafts by bolts 56 (Fig. 4). Preferably, the arms are made of light gauge metal so as to bend readily and avoid damage to the hopper in the event that a large and unbreakable piece of material is encountered. As the shaft turns, the arms 54 pass through the material in the hopper and keep the entire body in a state of agitation at the point of discharge through the bottom outlets thereby insuring continuous feeding of material from all of the outlets.

Figure 2:
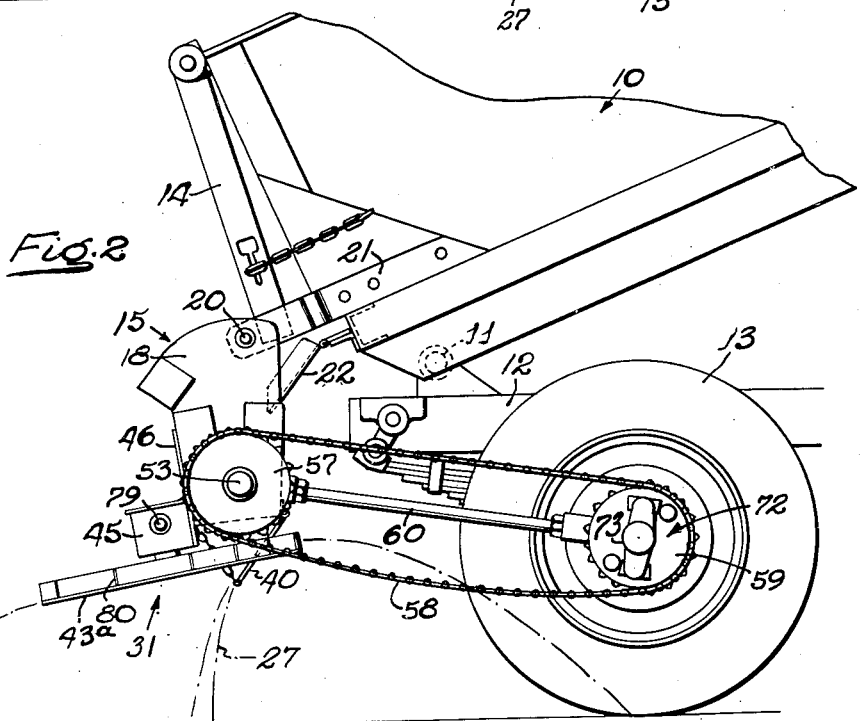
Fig. 2 is a side elevational view.

One projecting end of the shaft 53 carries a sprocket wheel 57 driven through a chain 58 from a similar sprocket 59 mounted on one vehicle drive wheel 13 for rotation about the wheel axis. Through a jaw clutch 72 (Fig. 2) including a shiftable collar 73 splined on the wheel axle the agitator shaft may be connected to or disconnected from the vehicle wheel. An adjustable bar 60 pivotally connected to the hopper and to a collar on the axle of the wheel 13 keeps the chain taut, and, during tilting of the truck body, swings the hopper so as to maintain the distributing disks 43 and 43ª in substantially the same angular position for all degrees of tilting of the body 10.

The spreader disks 43 and 43ª are rotated at a speed which at all times corresponds to the prevailing speed of the vehicle as distinguished from the speed of the vehicle engine. For this purpose, the disks are driven from the vehicle wheel and in this instance through the intermediary of the agitator shaft 53. Splined onto the latter is a shiftable clutch collar 62 having teeth 63 projecting in opposite directions for engagement with teeth 64 on either of two sprocket wheels 65 and 66 which are loose on the shaft 53. The sprockets are of different sizes and respectively connected through chains 67 and 68 to smaller sprockets 69 and 70 fast on a shaft 71 which projects through and is journaled in the adjacent gear box 45. Within the latter, the shaft carries a bevel gear 75 which meshes with a gear 76 on the shaft 44 of the spreader disk 43.

Through flexible couplings 77 and a shaft 78, the shaft 71 is connected to a shaft 79 that extends through and into the other gear box 45 and similarly is bevel geared to the shaft 44 of the spreader disk 43ª. The connections are such that during forward motion of the vehicle with the wheel and speed change clutches engaged, the disk 43 is turned counterclockwise while the disk 43ª turns clockwise as indicated by the arrows in Fig. 3. As a result, material discharged from the hopper onto the forward portions of the rotating disks is thrown off from the latter laterally and outwardly from the vehicle. When the clutch element 62 is engaging the sprocket 65, the spreader disks will turn at about five times the speed of the vehicle wheel, the ratio being 3 when when the drive is through the sprocket 66.

It will be observed that the streams 28 and 29 fall onto and are intercepted by portions of the disks 43 and 43ª which are moving laterally and outwardly relative to the path of travel of the vehicle. In order to impart the disk motion quickly to the material and thereby build up centrifugal force for throwing the material the proper distance, upstanding ribs 80 are formed on the upper surfaces of the disks 43 and 43ª and are shaped in a novel manner to impart the desired pattern to the curved curtains 83 of material that leave the disk peripheries and gravitate to the ground to cover the areas 24 and 25. Herein, the ribs are sheet metal blades of arcuate shape and about one inch wide, the disks being about two feet in diameter. The ribs radiate from a central hub 81 and are curved so that their leading sides are of convex contour. Eight equally spaced ribs are provided on each disk in this instance, and the outer end portions 82 of the alternate ribs are made straight and inclined forwardly relative to the direction of disk rotation so as to prolong the retention of part of the material on the disk.

As the two disks rotate, the streams 28 and 29 substantially fill the pockets between the ribs 80, and the material contained in these pockets is carried forwardly at the peripheral speed of the disks. The outermost portion of the material is thrown off after a relatively short arc of travel, while the inner portion is retained longer and acquires greater momentum so as to be thrown farther away from the disk. This action is progressive due to the curvature of the ribs and the inclination of the ends 82 with the result that the curtain 83 is of arcuate shape, and, when reaching the ground, is of a cross-sectional shape somewhat as indicated at 84 extending arcuately from a point 85 spaced laterally from the front of the disk to a point 86 spaced rearwardly from and substantially behind the center of the disk so as to be disposed adjacent to the edge of the ground area 23. Thus, the curtains 83 cover the ground areas 24 and 25 with the desired uniformity of distribution.

The distributor may be adjusted in various ways according to the condition of the ground being traversed, the size and dampness of the material, and the amount of material required to be distributed per unit of ground area. When working on hard ground, the low speed drive to the disks is ordinarily used and the levers 36, 50, and 51 are set to give increased volume, the vehicle speed usually being from 15 to 20 miles an hour. On soft ground where a slower vehicle speed, usually from 5 to 10 miles per hour, must be maintained, the volume of material discharged from the hopper would be decreased, and the high speed drive to the distributor disks would be used. Thus, it will be seen that the distributor is very versatile and well adapted to meet the widely varying conditions encountered in service. Because the disks 43 and 43ª are driven from the drive wheels of the vehicle, the material distributed over the areas 24 and 25 is proportional with the desired accuracy relative to that distributed gravitationally over the area 23. The distributor may be installed on any vehicle having a tilting dump body, and may be attached or detached quickly and conveniently. Moreover, it may be thrown into or out of action by the clutch 72 which may, if desired, be controlled from the vehicle cab.

I claim as my invention:

1. A distributor for loose material comprising an elongated hopper adapted to be supported on a wheeled vehicle to receive material from a tilting dump body on the vehicle, said hopper extending transversely of the vehicle and being open intermediate the ends of its bottom to provide for the discharge of material gravitationally and distribution of the same over the ground area traversed by the vehicle, said hopper having bottom outlets at opposite end portions outwardly beyond the gravitational discharge area, centrifugally acting means for receiving material discharged from said outlets and distributing the same to ground areas on opposite sides of said first area, and means for driving said last mentioned means from a ground-engaging wheel of said vehicle.

2. A distributor for loose material comprising an elongated hopper adapted for mounting in a horizontal position on a vehicle, the bottom of said hopper having outlet holes spaced therealong for the downward discharge of material in a row of spaced streams, a plate disposed beneath said hopper and adapted to intercept a group of said streams intermediate the ends of said row and to spread said streams into a curtain flowing downwardly to cover a ground area, a pair of disks disposed generally horizontally and positioned to intercept the streams of material at opposite ends of said row, and means driving said disks in directions to throw the material intercepted thereby outwardly so as to cover ground areas disposed on opposite sides and adjacent to said first mentioned area.

3. A distributor for loose material comprising, an elongated hopper adapted to be supported in a horizontal position on the rear end of a vehicle, said hopper having openings at opposite ends, two disks disposed in substantially horizontal positions with their forward portions underlying said openings to receive material therefrom, means for rotating said disks in opposite directions to carry the received material in an arcuate path first outwardly and then rearwardly, ribs carried by and radiating outwardly from the centers of said disks to form intervening pockets flaring outwardly along the tops of the disks and operating on said material falling from said hopper into said pockets to throw such material off from the disks by centrifugal action laterally and outwardly and also rearwardly from the disks whereby to leave an intermediate ground area between said disks uncovered, and means receiving material discharged downwardly from openings intermediate the ends of said hopper and distributing the same over said intermediate ground area.

GROVER D. PORTER.

REFERENCES CITED

The following references are of record in the file of this patent:

UNITED STATES PATENTS

| Number | Name | Date |
| --- | --- | --- |
| Re. 14,804 | Holden | Feb. 10, 1920 |
| 15,104 | Luce | June 10, 1856 |
| 290,385 | Atwood | Dec. 18, 1883 |
| 1,299,948 | Isaman | Apr. 8, 1919 |
| 1,655,780 | Brininger et al. | Jan. 10, 1928 |
| 1,776,814 | Lutz | Sept. 30, 1930 |
| 1,809,704 | Hurt | June 9, 1931 |
| 1,909,238 | Thompson | May 16, 1933 |
| 2,044,652 | Walker | June 16, 1936 |
| 2,059,548 | Broome | Nov. 3, 1936 |
| 2,097,102 | Moore | Oct. 26, 1937 |
| 2,180,253 | Moore | Nov. 14, 1939 |
| 2,340,657 | Goertzen | Feb. 1, 1944 |